United States Patent [19]

Michels et al.

[11] Patent Number: 4,712,250
[45] Date of Patent: Dec. 8, 1987

[54] TAPE PLAYER ADAPTER FOR CAR RADIO

[75] Inventors: Dennis Michels, New York; Geoff Howe, Brooklyn; Douglas Joseph, Neponsit, all of N.Y.

[73] Assignee: Sound Sender, Inc., East Hanover, N.J.

[21] Appl. No.: 764,786

[22] Filed: Aug. 12, 1985

[51] Int. Cl.⁴ .......................... H04B 7/14; H04B 1/34
[52] U.S. Cl. ........................................ 455/20; 455/99; 455/142; 455/41; 455/345; 369/6
[58] Field of Search ................. 455/99, 142, 144, 344, 455/345, 41, 100, 18, 20; 369/6, 8

[56] References Cited

U.S. PATENT DOCUMENTS

| | | | |
|---|---|---|---|
| 2,959,644 | 11/1960 | Grace | 455/344 |
| 3,751,601 | 8/1973 | Wally | 455/345 |
| 4,286,262 | 8/1981 | Wahl | 455/99 |
| 4,354,275 | 10/1982 | Bouyssounouse et al. | 455/18 |
| 4,412,106 | 10/1983 | Pavel | 455/100 |
| 4,507,646 | 3/1985 | Hamlin et al. | 455/41 |

Primary Examiner—Jin F. Ng
Attorney, Agent, or Firm—Edward R. Weingram

[57] ABSTRACT

A portable stereo cassette tape player is connected to an FM automobile radio through an adapter having an input plug which is inserted into the audio signal output terminal of the tape player and an output plug which is inserted into the cigarette lighter receptacle of the car. The direct voltage from the car battery is filtered and connected to a frequency modulation oscillator stage in which the audio signal from the tape player frequency modulates the oscillator. The weak frequency modulated signal is coupled into the FM car radio through the cigarette lighter receptacle by stray capacitance of the wires connected to the common power source or battery and proximity to the antenna and input stage of the radio. A tuning capacitor tunes the oscillator frequency to an unused location on the dial between local FM radio stations so that the audio signal can be heard on the normal frequency modulation radio band over the radio loud speakers.

12 Claims, 2 Drawing Figures

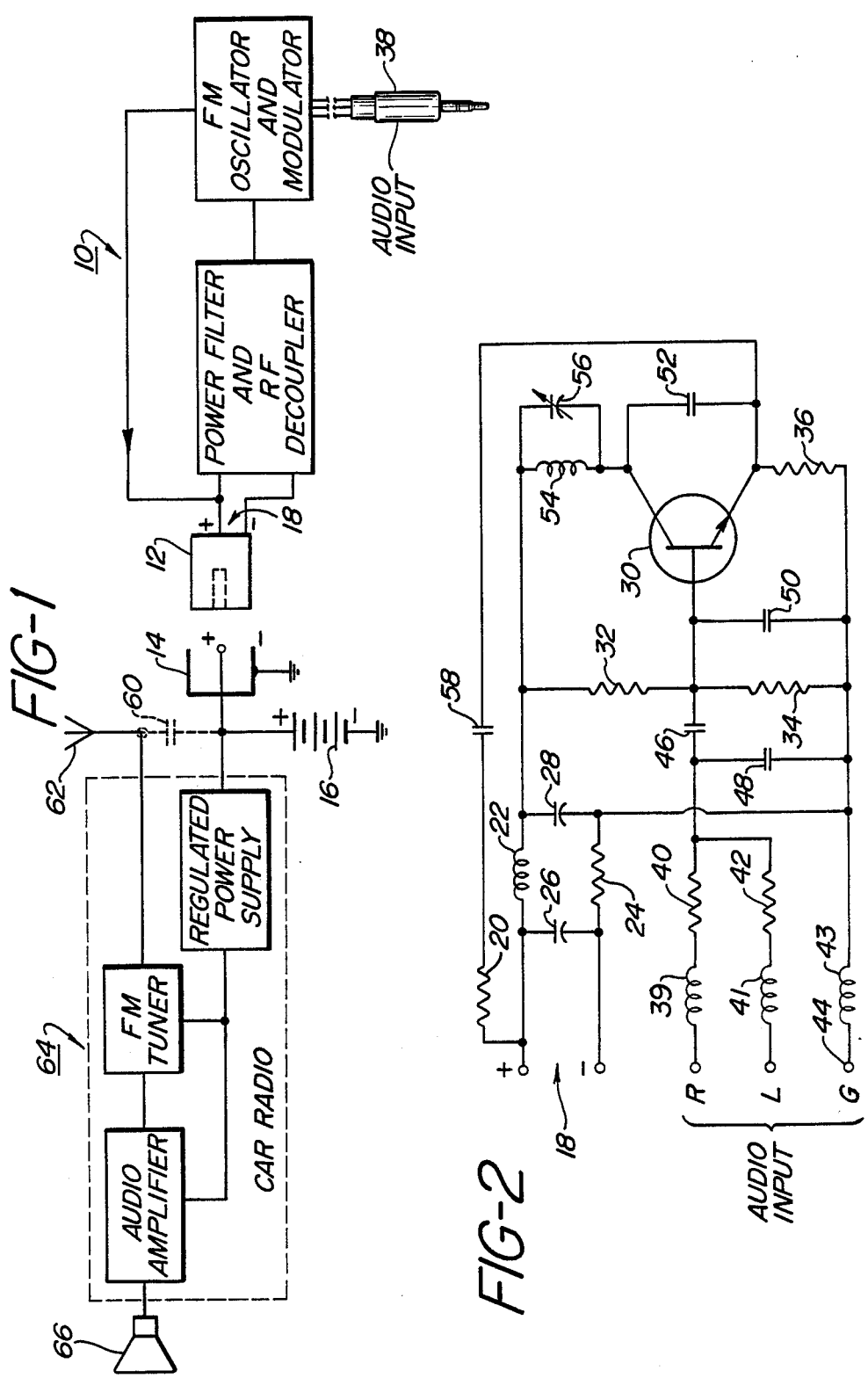

TAPE PLAYER ADAPTER FOR CAR RADIO

BACKGROUND OF THE INVENTION

1. Field of the Invention

The present invention relates to car radio cassette tape players and particularly to an adapter which permits a portable stereo cassette player to be connected to an FM car radio.

2. Description of the Prior Art

Presently known car radio tape players employ a combined unit that is installed in the automobile dashboard. The radio may be used separately or switched to connect to the output of the adjacent tape player. The cartridge or cassette tape is inserted into the tape player and heard through the speakers of the radio. A typical example of such a device is shown in U.S. Pat. No. 3,751,601 wherein a selector switch connects the tape player directly to the input amplifier of the radio or connects the radio to the automobile antenna. The tape player includes an audio amplifier, oscillator, and modulator which provide a modulated radio frequency signal to the radio. Another similar device is shown in U.S. Pat. No. 2,959,644, wherein the amplified amplitude modulated RF signal from an accessory tape player is connected to the radio antenna input of a standard AM radio through a plug. These devices, however, required an expensive tape player and radio to be installed in the automobile and could not be used with a separate portable stereo cassette player of a type that can be carried by an individual.

SUMMARY OF THE INVENTION

It is therefore a primary object of the present invention to provide a device that permits a portable stereo cassette player to be connected to an FM car radio.

Another object of the present invention is to apply the radio signal from a portable tape player to the car radio to be heard over the radio loud speakers without a direct connection to the input stage or antenna of the radio.

A further object of the invention is to utilize the car cigarette lighter receptacle to couple the audio signal from a portable tape player into the car radio.

A still further object of the invention is to utilize the car cigarette lighter receptacle to provide a connection to the car battery as the source of power for an adapter device to apply the audio signal from a portable tape player to the car radio.

Yet another object of the invention is to permit an FM car radio to play stereo cassette tapes from an external portable tape player without requiring installation of an expensive tape deck in the automobile.

An additional object of the invention is to provide a relatively simple inexpensive adapter device to permit a tape recording from an external portable cassette player to be connected to the car radio and heard over the radio loud speakers.

It is also another object of the invention to provide an adapter device between a portable cassette player and an FM car radio which utilizes a standard stereo miniature plug to connect to the stereo cassette player and a cigarette lighter plug to connect to the car radio.

It is a further object of the invention to provide an adapter device between a portable tape player and an FM car radio which does not require an antenna, an amplifier, or a separate power supply and operates on very low power.

It is an additional object of the invention to permit a stereo cassette player to be connected to an FM car radio with minimum noise and no interference with normal broadcasting station frequencies.

These objects are accomplished with an adapter module having a stereo miniature audio input plug that connects into the audio output receptacle of the stereo cassette player and an output plug in the form of a cigarette lighter that plugs into the car cigarette lighter receptacle. The direct voltage from the car battery is filtered and connected to an FM oscillator having an output frequency that is frequency modulated by the audio signal from the tape player. The weak FM signal is then coupled into the car radio through the cigarette lighter receptacle by the stray capacitance of the wires in the car power supply system and battery connections and by proximity to the antenna and input stage of the radio. A tuning capacitor in the output of the oscillator permits tuning of the frequency to a location on the FM radio dial between local stations so that the audio signal is heard on the normal FM band of 88–108 MHz over the radio loud speakers with minimum noise and interference.

Other objects and advantages will become apparent from the following description in conjunction with the accompanying drawings.

BRIEF DESCRIPTION OF THE DRAWINGS

FIG. 1 is a schematic block diagram of the system including an FM car radio and cigarette lighter receptacle into which the adapter of the present invention is plugged; and FIG. 2 is a schematic circuit diagram of the present adapter including the connections to the external power supply and audio input from the stereo cassette player.

DESCRIPTION OF THE PREFERRED EMBODIMENT

As shown in FIGS. 1 and 2, the adapter 10 includes a plug 12, which is in the form of a standard car cigarette lighter plug that fits into the cigarette lighter receptacle 14 of the car, which is connected to the car battery or direct voltage source 16. The direct voltage is connected through positive and negative terminals 18 to a power filter and decoupling network including inductance or coil 22, resistor 24 and electrolytic capacitors 26, 28, which filter out and suppress ignition noise and provide filtered direct voltage to an oscillator-modulator transistor stage 30. Resistors 32, 34, 36 provide proper direct voltage bias to the base and emitter electrodes of transistor 30.

Audio input from a portable stereo cassette tape player (not shown) is obtained from a standard stereo miniature plug 38 which is plugged into the receptacle of the tape player normally connected to a pair of earphones of a head set. The audio input for the right and left ear pieces are added together through coils 39, 41 and respective resistors 40, 42 and the third wire connection to the audio input plug provides a ground 44 connected through coil 43. The resistors reduce the audio input signal to a desired usable level while the coils aid in filtering out undesired radio frequency signals. The low frequency audio signal is fed into the base electrode of transistor 30 through electrolytic coupling capacitor 46, while capacitors 48, 50 serve to bypass the radio frequency (RF) signal emanating from the oscillator and along with the coils prevent the higher RF signal from being coupled into the audio input connector, as well as minimize any undesired tuning effects caused by the length of the input cord.

A feedback capacitor 52 between the collector and emitter electrodes of transistor 30 provides a positive feedback to initiate oscillation, while inductance or coil 54 and variable capacitor 56 form a tuned circuit which oscillates at a desired frequency that is adjustable in the FM band between 88-108 MHz. The audio signal modulates the base-to-collector capacitance of transistor 30 and thus frequency modulates the oscillator. The frequency modulated output of the oscillator is taken from the low impedance emitter electrode and coupled through capacitor 58 and resistor 20 to the positive terminal of the cigarette lighter plug 12 which connects to the positive battery terminal of the car. The emitter output provides an impedance match between the oscillator-modulator stage and the car battery. In addition, resistor 20 provides a constant load on the radio antenna and output transistor. This prevents tuning changes that may result from the RF being fed into the positive terminal of the power supply which has a low impedance to ground that changes with load on the battery. Due to imperfect shielding and stray capacitance 60 of the wires connected to the battery and the proximity to the car radio antenna 62 and input stage, the 10 w power frequency modulated signal from the adapter is coupled through the cigarette lighter plug into the FM car radio 64. No separate amplifier or direct connection to the car radio antenna or input stage are necessary.

The radio is set to an unused frequency within the FM band which is between local stations in order to avoid interference. The tuning capacitor 56 is then manually adjusted until the audio signal is heard clearly at the frequency setting of the radio, with the FM radio providing the necessary amplification so that the audio signal from the tape player is heard over the car radio loud speakers 66. The use of frequency modulation by the adapter in conjunction with the car FM radio inherently provides a relatively noise free clear audio signal from an external tape player without requiring an expensive tape deck installation. Since the adapter unit operates on extremely low power, no on-off switch is necessary. However, by simply pulling the plug out of the cigarette lighter receptacle a small amount, the small light weight unit is disconnected from the power source and can actually be held or stored in the receptacle without being on.

Typical values for the various components of the adapter are as follows:

| | |
|---|---|
| Resistor 20 | 470 ohms |
| Resistor 24 | 100 ohms |
| Resistor 32 | 10K ohms |
| Resistor 34 | 2.7K ohms |
| Resistor 36 | 2.7K ohms |
| Resistor 40 | 100 ohms |
| Resistor 42 | 100 ohms |
| Coil 22 | 100 microhenries |
| Coil 39 | 100 microhenries |
| Coil 41 | 100 microhenries |
| Coil 43 | 100 microhenries |
| Coil 54 | .1 microhenries |
| Capacitor 26 | 50 microfarads at 50 volts |
| Capacitor 28 | 50 microfarads at 50 volts |
| Capacitor 46 | .22 microfarads at 16 volts |
| Capacitor 48 | .002 microfarads |
| Capacitor 50 | 470 picofarads |
| Capacitor 52 | 10 picofarads |
| Capacitor 56 | 21-33 picofarads |
| Capacitor 58 | 39 picofarads |
| Transistor 30 | 2N3904 |

While only a single embodiment has been illustrated and described, it is apparent that many variations may be made in the particular design and configuration without departing from the scope of the invention as set forth in the appended claims.

What is claimed is:

1. A device for coupling an audio signal from an external source to an automobile radio, said radio including an antenna, an input stage, and an output stage having a loud speaker, and a connection to the automobile source of direct voltage, comprising:

input means for connection to said audio signal source;

output means for coupling an output signal to said radio input stage and for connecting said device to said direct voltage source;

a modulator-oscillator stage;

filter means connected to said output means and direct voltage source for providing a filtered direct voltage to operate said modulator-oscillator stage;

signal coupling means for applying said audio signal from said input means to said modulator-oscillator stage;

feedback means for causing radio frequency oscillation in said modulator-oscillator stage;

tuning means for establishing a selected frequency of said oscillation, said oscillation frequency being modulated by said audio signal to provide an output signal; and means for connecting said output signal via said output means to apply said output signal to said radio to be heard over said radio loud speaker.

2. The device of claim 1 wherein said connection to said automobile source of direct voltage is a cigarette lighter receptacle and said output means is a cigarette lighter plug insertable into said receptacle, said output signal being coupled into said radio input stage by said receptacle through stray capacitance of wires connected to said direct voltage source and by proximity to said antenna and input stage.

3. The device of claim 2 wherein said external source of audio signal is a tape player having an output receptacle and said input means is a plug insertable into said output receptacle.

4. The device of claim 3 wherein said automobile radio is a frequency modulation receiver, said modulator-oscillator providing an oscillation frequency in the frequency modulation band, said audio signal modulating said oscillation frequency to provide a frequency modulated output signal.

5. The device of claim 4 wherein said tuning means is adapted to select a frequency in the frequency modulation receiver band between local stations to permit weak audio signals to be coupled into said radio to be heard over the radio loud speaker.

6. The device of claim 5 wherein said external audio signal source is a portable stereo cassette player providing two signals, said input means plug being a stereo miniature plug, and said signal coupling means includes a parallel pair of coils and respective series connected resistors for combining said two signals.

7. The device of claim 6 wherein said modulator-oscillator includes a transistor having emitter, base and collector electrodes and further including bias means connected between said filter means and transistor electrodes providing direct operating voltages to said electrodes.

8. The device of claim 7 wherein said means for connecting said output signal includes a capacitor and resistor connected in series between the emitter electrode of said transistor and one terminal of said cigarette lighter plug.

9. The device of claim 8 wherein said tuning means includes a coil and tuning capacitor connected in parallel and to the collector electrode of said transistor.

10. The device of claim 9 wherein said signal coupling means includes a capacitor connected between said input means and the base electrode of said transistor.

11. The device of claim 10 wherein said feedback means includes a capacitor connected between said collector and emitter electrodes.

12. A device for coupling an audio signal to an automobile radio comprising:
- input means for connection to a source of audio signals;
- output means connecting said device to a source of direct voltage in the automobile and for coupling an output signal to said radio;
- modulator-oscillator means;
- signal coupling means connected to said input means and to said modulator-oscillator means for connecting said audio signal to said modulator-oscillator means;
- tuning means for establishing a selected frequency of oscillation, said oscillation frequency being modulated by said audio signal for generating said output signal; and
- means connecting said output signal via said output means for supplying said output signal to said radio via said connection to said direct voltage source.

* * * * *